United States Patent

Sato et al.

[11] Patent Number: 5,452,098
[45] Date of Patent: Sep. 19, 1995

[54] FACSIMILE APPARATUS

[75] Inventors: Kazutaka Sato, Kashiwa; Michihiro Watanabe, Tsuchiura; Masahisa Aoyagi, Ishioka; Taisaku Seino, Ibaraki; Katsuo Ohki, Ibaraki; Hiromitsu Fukuda, Ibaraki; Hideyuki Kawase, Katsuta; Kimio Oga, Mito; Akira Shimizu; Youichi Narui, both of Katsuta; Tsuguo Suzuki, Owariasahi; Yasuo Otsuka, Chigasaki; Kazutoshi Konno, Tokyo, all of Japan

[73] Assignee: Hitachi, Ltd., Tokyo, Japan

[21] Appl. No.: 36,866

[22] Filed: Mar. 25, 1993

[30] Foreign Application Priority Data

Mar. 25, 1992 [JP] Japan .................. 4-067160
Apr. 17, 1992 [JP] Japan .................. 4-097675

[51] Int. Cl.⁶ ............................................. H04N 1/00
[52] U.S. Cl. .................................. 358/400; 358/496; 358/498; 358/471; 358/300
[58] Field of Search ............... 358/476, 400, 494, 496, 358/296, 300, 401, 498; 346/76 PH, 134, 136; 347/3, 108; 355/202

[56] References Cited

U.S. PATENT DOCUMENTS

| | | | |
|---|---|---|---|
| 4,630,123 | 12/1986 | Kadomatsu | 358/256 |
| 4,855,839 | 8/1989 | Saito | 358/296 |
| 4,872,061 | 10/1989 | Uchiyama | 358/400 |
| 5,041,872 | 8/1991 | Nukaya et al. | 358/300 |
| 5,122,882 | 6/1992 | Ishida et al. | 358/296 |
| 5,140,438 | 8/1992 | Kurahashi et al. | 358/401 |
| 5,153,750 | 10/1992 | Hiroi et al. | 358/496 |
| 5,166,707 | 12/1992 | Wantanabe et al. | 358/296 |
| 5,270,841 | 12/1993 | Watanabe | 358/496 |
| 5,274,477 | 12/1993 | Mori et al. | 358/300 |
| 5,327,250 | 7/1994 | Ikeda | 358/498 |
| 5,337,165 | 8/1994 | Riousset et al. | 358/498 |

Primary Examiner—Edward L. Coles, Sr.
Assistant Examiner—Fan Lee
Attorney, Agent, or Firm—Antonelli, Terry, Stout & Kraus

[57] ABSTRACT

A facsimile apparatus has a lower structure and an upper structure which is swingable between a raised open position an a lowered closed position about a pivot located at a lower part of the rear end portion of the apparatus. A thermal print head is fixed to the front end portion of the upper structure. A recording medium conveyor roller is fixed to the front end portion of the lower structure. A linear image sensor and an original sheet conveyor roller are fixed to a central portion of the lower structure. The recording medium is placed on the lower structure at a position between the thermal print head and the linear image sensor.

7 Claims, 11 Drawing Sheets

FRONT — REAR

FRONT — REAR

REAR　　　　　　　　　　　　　　　　FRONT

FACSIMILE APPARATUS

BACKGROUND OF THE INVENTION

1. Field of the Invention

The present invention relates to a facsimile apparatus for communication of image information and, more particularly, to a facsimile apparatus having a reduced size and improved operability.

2. Description of the Related Art

Nowadays, facsimile apparatus which have been used mainly in offices are finding spreading use in ordinary homes, and there is an increasing demand for reduction in the size and cost, as well as ease of operation.

Known facsimile apparatus, which are rather close in construction to the facsimile apparatus of the present invention, will be described with reference to FIGS. 4 to 6.

FIG. 4 shows in section a known facsimile apparatus disclosed in Japanese Patent Unexamined Publication No. 61-133756. This facsimile has a lower structure and an upper structure which can be pivotally moved up and down about a pivot 5. The upper structure is shown both in the raised position and laid-down position. A thermal print head 3 is fixed to the upper structure, while an original conveyor roller 8, a linear image sensor 4 and a recording medium feed roller 7 are fixed to the lower structure 2. A sheet of recording paper 6 is fed by the recording medium feed roller 7, while an original 17 carrying image information to be transmitted is introduced into the apparatus by the operation of an original feed roller 15 and is then conveyed by the original conveyor roller 8. Meanwhile, the image on the original is photoelectrically converted by the linear image sensor 4. The original is then ejected outside the apparatus by the original ejection roller 14. Thus, in the facsimile apparatus shown in FIG. 4, an original reading system is provided on the front portion of the apparatus, while a recording system is mounted on the rear part of the apparatus.

FIG. 5 is a sectional view of another known facsimile apparatus. This apparatus also has a lower structure and a pivotable upper structure. More specifically, the upper structure 1 has a thermal print head 3 fixed thereto, while the lower structure 2 carries an original conveyor roller 8, linear image sensor 4 and a recording medium conveyor roller 7. The upper structure is pivotable up and down about a pivot 5. When the lower structure is in the lowered position, a lock arm 11 is retained on the lock arm pin 11b. The thermal head 3 is pressed against the recording medium conveyor roller 7 by a head pressing spring 10. The original 10 carrying image information to be transmitted is introduced into the apparatus by means of original feed rollers 15a, 15b and is conveyed by the original conveyor roller 8. Meanwhile, the image on the original is photoelectrically converted by the linear image sensor 4. Finally, the original is ejected to the exterior of the apparatus by means of original ejection rollers 14a and 14b. The original conveyor roller 8 may be moved apart from the linear image sensor 4 by lifting an original conveyor roller release arm 9. The original conveyor roller 8 is pressed against the linear image sensor 4 by means of a roller pressing spring 12. The, original reading system is disposed on the front part of the apparatus, while the rear part carries the recording system.

FIG. 6 is a sectional view of still another known facsimile apparatus. This facsimile has, similarly to the known facsimile apparatuses described above, a lower structure and an upper structure which is pivotable up and down on the lower structure. More specifically, the upper structure 1, having a thermal head 3 fixed thereto, is pivotable about a pivot 5 towards and away from the lower structure 2 to which are fixed a linear image sensor 13 and a recording medium conveyor roller 7. In this facsimile apparatus, a CCD (charged coupled device) sensor having a fine optical system including lense and mirrors is used as the linear image sensor. This linear image sensor employs a white board 19 in place of the original conveyor roller 8 shown in FIGS. 4 and 5. The original 17 carrying the image to be transmitted is introduced into the apparatus by the original feed rollers 15a and 15b and the image is photoelectrically converted as the original passes through the gap between the white board 19 an the linear image sensor 13. The original is finally discharged outside the apparatus by the original ejection rollers 14a and 14b. The linear image sensor 13 is sandwiched between a control circuit board 20 and the power supply 21 and is fixed to the lower structure 2. In the described apparatus, the recording system is disposed on the front part, while the reading system is disposed in the rear part of the apparatus.

The known facsimile apparatus of the type shown in FIG. 4 is advantageous in that the recording system is exposed when the upper structure is swung upward apart from the lower structure, thus facilitating setting of a new roll of thermally sensitive paper as the recording medium and removal of jamming paper if any. However, since the reading system is not opened even when the upper structure is swung upward, it is not easy to remove the original paper jamming in a portion of the path of convey.

In the facsimile apparatus of the type shown in FIG. 5, both the recording system and the reading system are opened when the upper structure is swung upward, so that setting of the new paper roll of thermally sensitive paper, as well as removal of any jamming thermally sensitive paper or original paper, can be done easily as compared with the apparatus shown in FIG. 4. This known apparatus, however, is still unsatisfactory in that, since the thermal print head which has to be pressed down by a large pressure to attain high image quality is remote from the pivot of the upper structure and from the lock arm pin, the upper structure tends to deflect upward. In order to reduce the deformation, it is necessary to enhance the rigidity of the upper structure. Furthermore, since the recording system is on the rear part of the upper structure, the upper structure has to swing upward over a large angle in order to enable setting of the new roll of the thermally sensitive paper.

Furthermore, this type of apparatus requires five rollers arranged along the path of movement of the original in order to feed, convey and eject the original: namely, a pair of original feed rollers, an original conveyor roller and a pair of original eject rollers. Consequently, the price of the apparatus is raised due to the use of the plurality of rollers. In addition, assembly efficiency is impaired due to difficulty in attaining alignment between the pair of original feed rollers and between the pair of original eject rollers, because one of the feed rollers and one of the eject rollers are fixedly mounted on the upper structure.

In the facsimile apparatus of the type shown in FIG. 6, both the recording system and the reading system are opened when the upper structure is swung upward, so that setting of the new paper roll of thermally sensitive paper, as well as removal of any jamming thermally sensitive paper or original paper, can easily be done. Since the thermal print head which has to be pressed down by a large pressure is close to the lock arm pin, it is easy to apply a large pressure to the thermal head. Furthermore, setting of the new roll of thermally sensitive paper is easily accomplished because the recording system is in the front part of the apparatus. In this apparatus, however, the linear image sensor occupies a large space because it employs a CCD sensor having lenses and mirrors, with the result that the size of the apparatus is increased. Furthermore, assembly efficiency is impaired and the price is raised as in the case of the apparatus shown in FIG. 5, due to use of pairs of original feed and eject rollers, with one of the rollers of each pair being fixedly mounted on the upper structure.

SUMMARY OF THE INVENTION

In view of the problems described above, an object of the present invention is to provide a facsimile apparatus which is improved to permit easy setting of new thermally sensitive paper, as well as easy removal of any jamming thermally sensitive paper or original paper.

Another object of the present invention is to provide a facsimile apparatus which can have a reduced size without requiring an increase in the rigidity of the upper structure, and which employs a reduced number of rollers to reduce the price while facilitating assembly.

To these ends, according to one aspect of the present invention, there is provided a facsimile apparatus for converting image information into electric signals and for transmitting the electric signals to a communication network and for receiving electric signals from the communication network and converting the received electric signals into image information. The facsimile apparatus includes a lower structure and an upper structure which is swingable about a pivot provided on a rear portion of the apparatus between a raised open position and a lowered close position, with the facsimile apparatus comprising a recording thermal print head for recording image information on a recording medium; a recording medium conveyor roller for conveying the recording medium, and with the thermal print head and the recording medium conveyor roller being disposed on a front portion of the apparatus. A linear image sensor reads the image information carried by an original sheet, and an original sheet conveyor roller conveys the original sheet. The linear image sensor is disposed on a central portion of the facsimile apparatus, and the recording medium is disposed between the thermal print head and the linear image sensor. The thermal print head is fixed to the upper structure, with the recording medium conveyor roller, the linear image sensor and the original conveyor roller being fixed to the lower structure.

According to another aspect of the present invention, there is provided a facsimile apparatus for converting image information into electric signals and for transmitting the electric signals to a communication network and for receiving electric signals from the communication network and for converting the received electric signals into image information. The facsimile apparatus including a lower structure and an upper structure which is swingable about a pivot provided on a rear portion of the apparatus between a raised open position and a lowered close position, with the facsimile apparatus comprising two conveyor rollers disposed in the facsimile apparatus a recording thermal print head for recording the image information on a recording medium, a recording medium conveyor roller as one of the two conveyor rollers, for conveying the recording medium. The thermal print head and the recording medium conveyor rollers are disposed on a front portion of the apparatus. A linear image sensor for reading the image information on an original sheet is provided with an original sheet conveyor roller forming the other of the two conveyor rollers. The linear image sensor and the original sheet conveyor roller are disposed on a control portion of the apparatus. The recording medium is disposed between the thermal print head and the linear image sensor. The thermal print head is fixed to the upper structure, the recording medium conveyor roller, the linear image sensor and the original sheet conveyor roller being fixed to the lower structure.

According to still another aspect of the present invention, there is provided a facsimile apparatus for converting image information into electric signals and for transmitting the electric signals to a communication network and for receiving electric signals from the communication network and for converting the received electric signals into image information. The facsimile apparatus comprising a single original sheet conveyor roller; a linear image sensor for reading the image information on an original sheet, with the original sheet conveyor roller being held in contact with the linear image sensor. Means are provided for enabling the original sheet conveyor roller to be moved apart from said linear image sensor as required. The angle at which the original sheet is fed is in a range of between 20° to 30° with respect to the surface of the linear image sensor and the angle at which the original sheet is ejected is in a range of between 20° to 30° with respect to the surface of the linear image sensor.

According to a further aspect of the present invention, there is provided a facsimile apparatus for converting image information into electric signals and for transmitting the electric signals to a communication network and for receiving electric signals from the communication network and for converting the received electric signals into image information. The facsimile apparatus comprising a single original sheet conveyor roller, and a linear image sensor for reading the image information on an original sheet. With the original sheet conveyor roller being held in contact with the linear image sensor. Means are provided for enabling the original sheet conveyor roller to be moved apart from the linear image sensor as required. The linear image sensor is a contact type linear image sensor having a photoelectric conversion element array of a length equal to a maximum width of the original sheet which can be handled by the facsimile apparatus.

According to a still further aspect of the present invention, there is provided a facsimile apparatus for converting image information into electric signals and for transmitting the electric signals to a communication network and for receiving electric signals from the communication network and for converting the received electric signals into image information. The facsimile apparatus comprising: a lower structure and an upper structure swingable about a pivot relative to the lower structure between a raised open position and a lowered close position, with the pivot being provided on a rear portion of the lower structure at a level which is below half a height of the lower structure as measured from the bottom.

According to a still further aspect of the present invention, there is provided a facsimile apparatus for converting image information into electric signals and for transmitting the electric signals to a communication network and for receiving electric signals from the communication network and converting the received electric signals into image information. The facsimile apparatus comprising a lower structure and an upper structure swingable about a pivot provided on a rear portion of the apparatus between a raised open position and a lowered close position, with a spring fixed to one of the upper and lower structures and contacting the structure to which said spring is not fixed. A member having a slot formed therein, is fixed to one of the upper and lower structures, with a projection being formed in the structure to which the member is not fixed, and with the projection being received in the slot in the member.

According to a still further object of the present invention, there is provided a facsimile apparatus having for converting image information on an original sheet of a size greater than A-4 size into electric signals and for transmitting the electric signals and for converting received electric signals into image information and recording the image information on a recording medium of a width greater than that of A-4 size paper, wherein the width and the length of the facsimile apparatus are not greater than the width and the length of an A-4 size paper.

DESCRIPTION OF THE PREFERRED EMBODIMENTS

Figure 1:
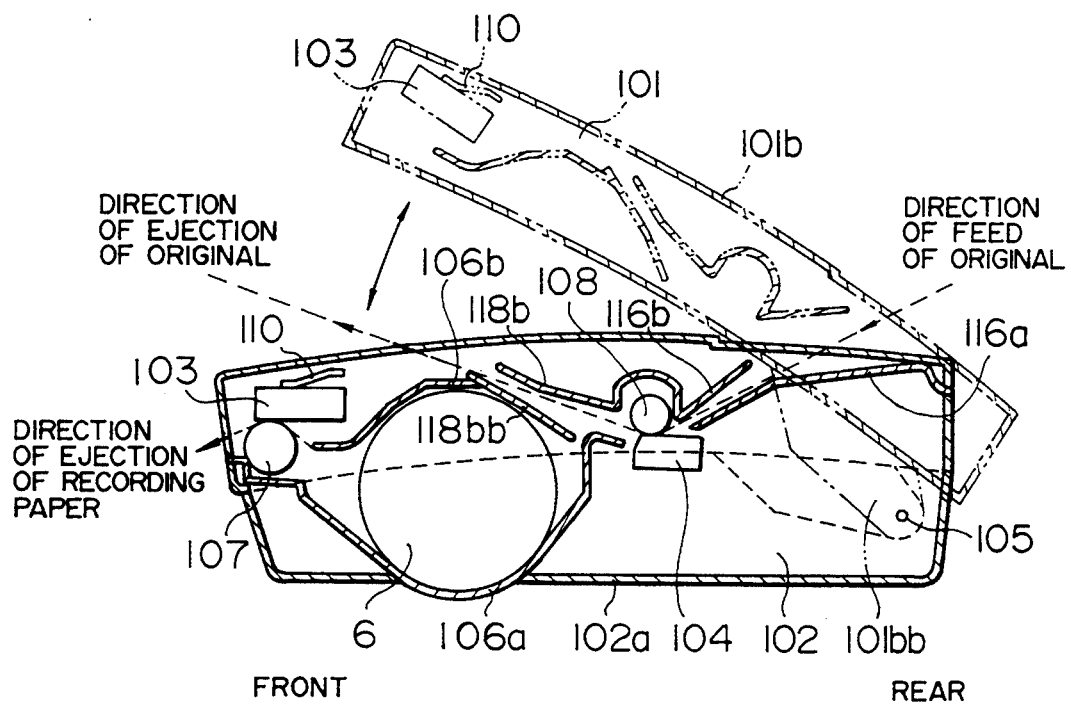
FIG. 1 is a sectional view of a first embodiment of the facsimile apparatus in accordance with the present invention.

A first embodiment of the present invention will be described with reference to FIGS. 1 to 3. The facsimile apparatus of this embodiment has a lower structure 102 and an upper structure 101 which is pivotable about a pivot 105 between an upper or "open" position and a lower or "closed" position. An upper structure cover 101b and an upper structure arm 101bb are fixed to the upper structure 101. A lower structure cover 102a is fixed to the lower structure 102. In FIG. 1, the upper structure 101 is shown both at the open and close positions as it is pivoted or swung between the positions as indicated by the double-headed arrow. A recording system which outputs the received image information is disposed on the front side of the apparatus. This embodiment employs a thermal recording type recording system having a thermal print head 103 which is fixed to the upper structure 110. The thermal head 103 is pressed by a head pressing spring 101 with a force of 2.5 kg onto a recording paper conveyor roller. A reading system for reading an original image information to be transmitted is disposed substantially at the center of the apparatus. A contact-type linear image sensor, which is suitable for attaining reduced apparatus size, is used as the linear image sensor which performs photoelectric conversion of the original image. This reading sensor 104 is fixed to the lower structure. The linear image sensor 104 is fixed to the lower structure 102 of the apparatus. The original conveyor roller 108 is made of a white silicone rubber having a friction coefficient of 1.0. No anti-foul coating is provided on the surface of this roller. Conveyance of the original is conducted by this roller 108 alone.

The described facsimile apparatus therefore employs only two rollers, namely, a recording paper conveyor roller 107 and the original conveyor roller 108. The original conveyor roller 108 also is fixed to the lower structure. In this embodiment, however, a releasing mechanism as shown in FIG. 3 is employed so that the original conveyor roller 108 can easily be moved apart from the linear image sensor 104 in the event of, for example, jamming of the original sheet. The original conveyor roller 108 is pressed onto the linear image sensor 104 with a force of 1.0 kg, by a roller pressing spring 112 which will be described later with reference to FIG. 3. The original sheet 17 carrying an image information to be transmitted is introduced into the gap between the upper surface 116a of the lower structure and the lower surface 116b of the upper structure and then into the gap between the linear image sensor 104 and the original conveyor roller 108 at an angle of 20° to 30° to the surface of the linear image sensor 104. The image information on the original sheet 107 is photo-electrically converted into electrical signals by the linear image sensor 104. The original sheet 107 is then ejected to the exterior of the apparatus through a gap formed between paper eject guides 118b and 118bb. The angle at which the original sheet is ejected is also set to 20° to 30°. The recording paper 6 is positioned between the recording system and the reading system, and is placed between a recording paper table 106a of the lower structure and a recording paper pressing member 106b in the upper structure. The pivot 105 is mounted on a lower part of the rear end of the lower structure, so that a wide opening area is obtained when the upper structure is swung to the open position.

Figure 3:
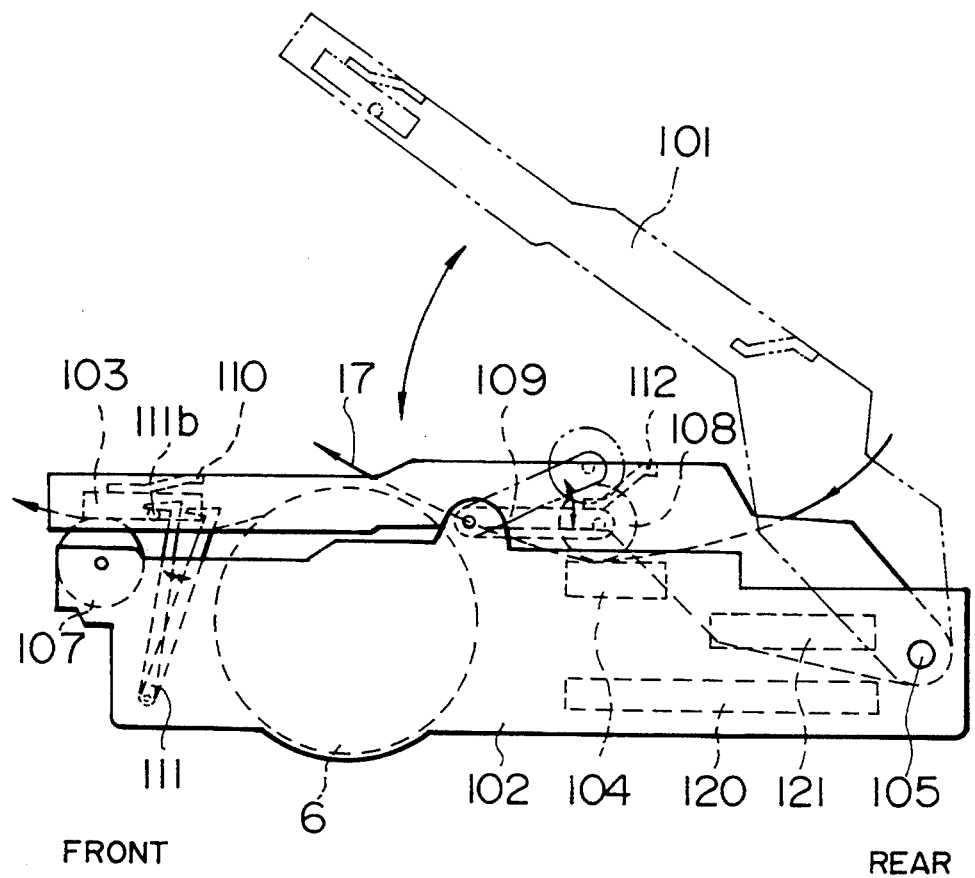
FIG. 3 is a sectional view of the first embodiment of the facsimile apparatus in accordance with the present invention.
Figure 4:
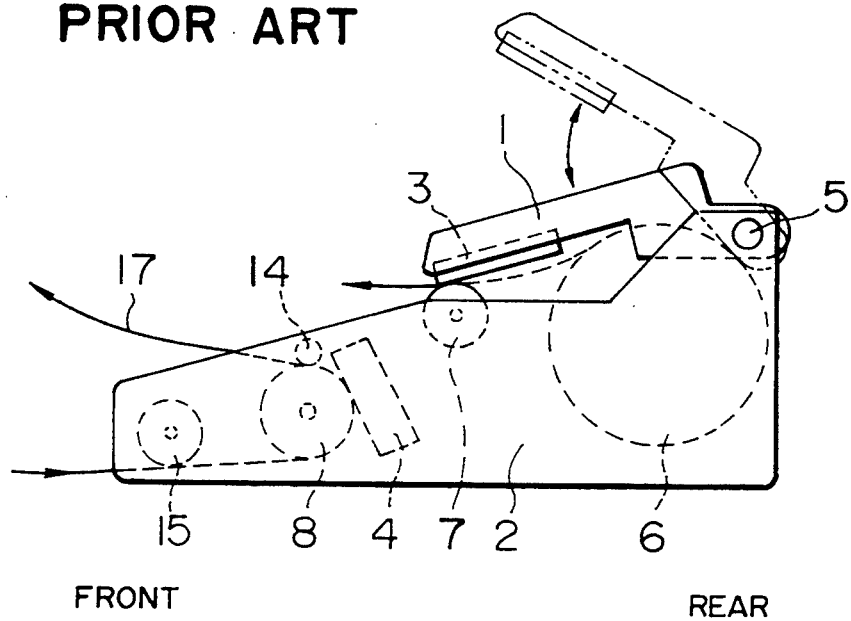
FIG. 4 is a sectional view of a prior art facsimile apparatus.

FIG. 3 shows the same facsimile apparatus taken along a plane different from that of FIG. 1. The upper structure 101 is swingable relative to the lower structure 102 about the pivot 105 provided on the rear end of the apparatus. The recording system including the thermal print head 103 and the recording medium conveyor roller 107 is positioned on the end of the apparatus remote from the pivot 105. The thermal print head 103 and the recording medium conveyor roller 107, respectively, are mounted on the upper and lower structures. On the other hand, the reading system including the linear image sensor 104 and the original conveyor roller 108 is positioned substantially at the center of the apparatus. Both the linear image sensor 104 and the original conveyor roller 108 are mounted on the lower structure. The original conveyor roller 8, however, is movable apart from the linear image sensor 104 as an original conveyor release arm 109 is lifted. The thermal print head 103 is pressed onto the recording medium conveyor roller 107 by means of a head pressing spring 110 which is fixed to the upper structure.

The original conveyor roller 108 is pressed into the linear image sensor 104 by a roller pressing spring 112 which is fixed to the upper structure. The original sheet carrying the image information to be transmitted is introduced into the apparatus of the original sheet conveyor roller 108. The image information is then photo-electrically converted into electric signals by the linear image sensor 104. The original sheet is then ejected to the exterior of the apparatus by the original conveyor roller 108. Thus, in the described embodiment of the facsimile apparatus, there is no roller on the upper structure. The linear image sensor 104 is arranged so as not to contact with the control circuit board 120 and the power supply 121 which produce heat during operation, because the output of the linear image sensor tends to vary according to temperature.

It is possible to use a CCD sensor with fine optical system including lenses and mirrors, as the linear image sensor 104. From the view point-of reduction in the size of the apparatus, however, it is preferred to use a contact type linear image sensor which has a photoelectric element array of a length equal to the maximum width of the original which can be handled by the facsimile apparatus, because such a contact type sensor does not require any minute optical system.

It is possible to use two or more original conveyor rollers 105 on the lower structure. The described arrangement which employs only one original conveyor roller 108 is preferred, from the view point of reduction in the size and price of the apparatus.

The described facsimile apparatus may employ two independent drive motors, namely, one for driving the recording medium conveyor roller 107 and one for driving the original conveyor roller 108. A further reduction in the price, however, can be achieved by driving both these rollers by a single driving motor. Such a driving system employing only one drive motor may employ a movable gear train which, when the facsimile apparatus operates in receiving mode, is brought by the gear rotation into engagement with a gear train drivingly connected to the recording medium conveyor roller 107 so as to transmit the output torque of the driving motor to the recording medium conveyor roller 107. When the facsimile apparatus operates in transmitting mode, the above-mentioned movable gear train is reversed so as to bring itself by the torque of the gears into engagement with a gear train drivingly connected to the original conveyor roller 108, thereby transmitting the output torque of the driving motor to the original conveyor roller 108. When the facsimile apparatus is used in copying mode, the above-mentioned movable gear train is set in the driving connection for the transmitting mode and, at the same time, another movable gear train is brought by a solenoid into engagement with the gear train connected to the recording medium conveyor roller 107, so that the power of the single driving motor is transmitted both to the original conveyor roller 108 and the recording medium conveyor roller 107.

Figure 22:
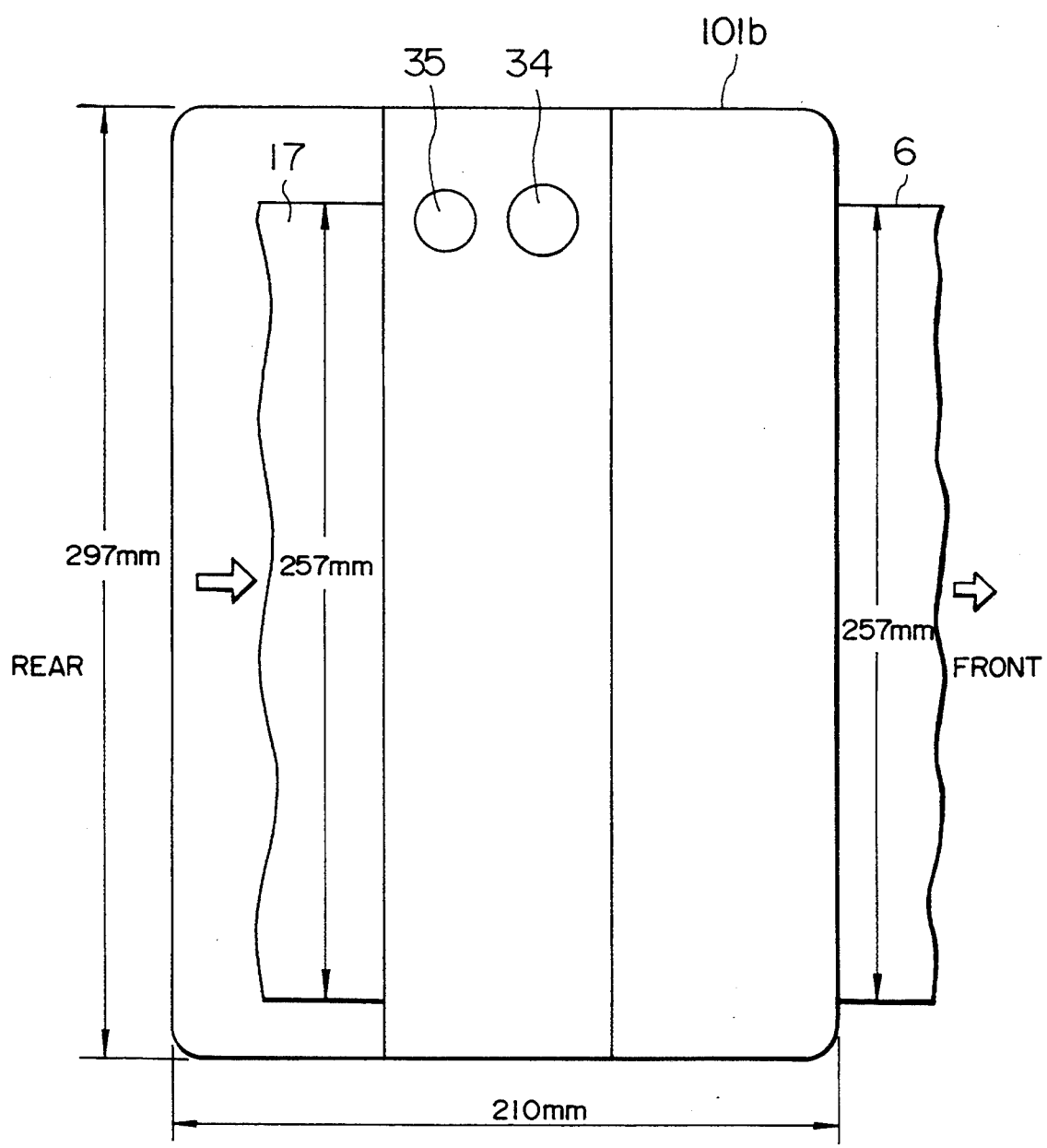
FIG. 22 is a plan view of a facsimile apparatus embodying the present invention.

The upper structure carries, as shown in FIG. 22, a transmission start button 34 for the conveyance of the original, and a stop button for stopping the conveyor system. The maximum width of the original 17 which can be handled by the facsimile apparatus is 257 mm. It is thus possible to transmit image information carried by a B-4 size paper. It is also possible to record received image on a B-4 size recording medium. The dimensions of the facsimile apparatus when viewed from the upper size is 210 mm in length and 297 mm in width which are the same as the width and length of an A-4 size paper. Thus, the facsimile apparatus occupies an extremely small area when placed on a desk. Thus, the facsimile apparatus of the present invention can transmit image on a B-4 size paper and can record received image on a B-4 size paper, but occupies an area which is as small as that of an A-4 size paper when placed on a desk, thus enabling efficient use of the limited area on the desk. It is to be noted that the dimensions of the A-4 and B-4 size paper may contain errors of ±2 mm specified in Japanese Industrial Standards PO138-1961.

Figure 7:
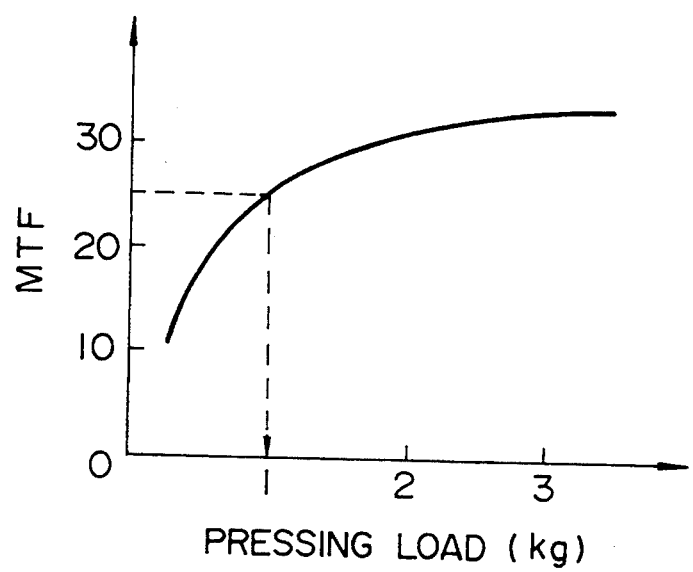
FIG. 7 is a graph showing the relationship between pressing load applied to a linear image sensor and MTF.
Figure 8:
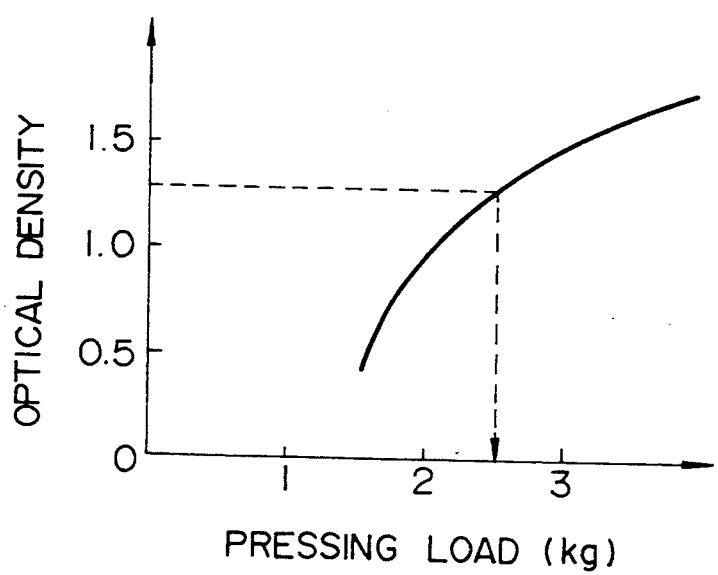
FIG. 8 is a graph showing the relationship between the pressing load applied to thermal print head and optical density.

FIG. 7 illustrates the relationship between the level of the load with which the linear image sensor is pressed and the modulation transfer function (referred to as "MTF"). MTF is a value represented by $(V_W−V_B)/(V_W+V_B)$, where $V_W$ and $V_B$ respectively indicate the white and black outputs obtained when an image having four black lines within a band of 1 mm width is read. In order to read an image without any blur, it is necessary that the value of MTF is 25% or greater. To obtain such MTF value, the pressing load applied to the linear image sensor should be 1 kg or greater. FIG. 8 shows the relationship between the load with which the thermal print head is obtained and the coloring density of the recorded image. In order to obtain a record without rubbing, the coloring density should be 1.3 or greater, which requires a pressing load of 2.5 kg or greater.

Figure 5:
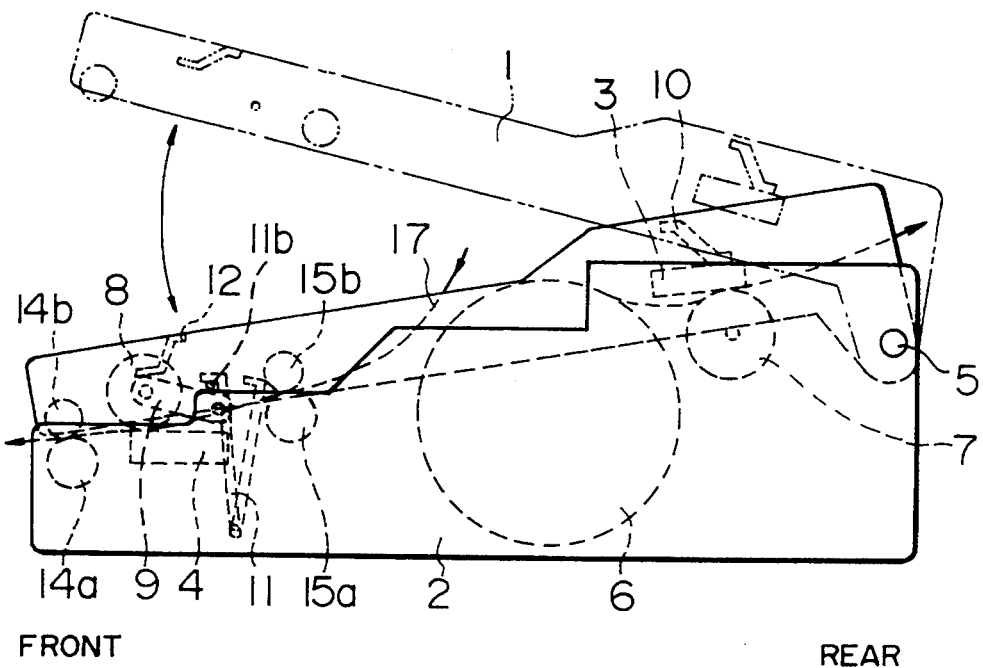
FIG. 5 is a sectional view of another prior art facsimile apparatus.
Figure 9:
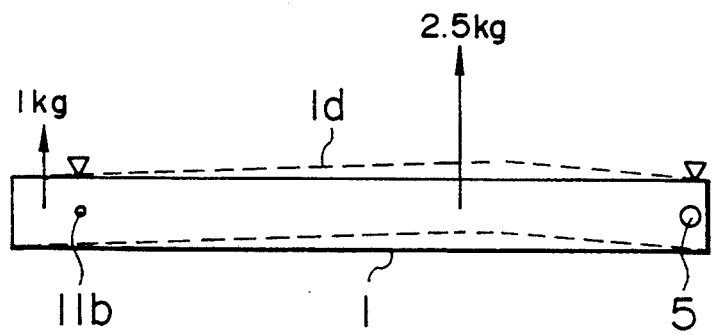
FIG. 9 is an illustration of deformation of an upper structure of a facsimile apparatus in which a thermal print head is mounted on a central portion of the upper structure.
Figure 10:
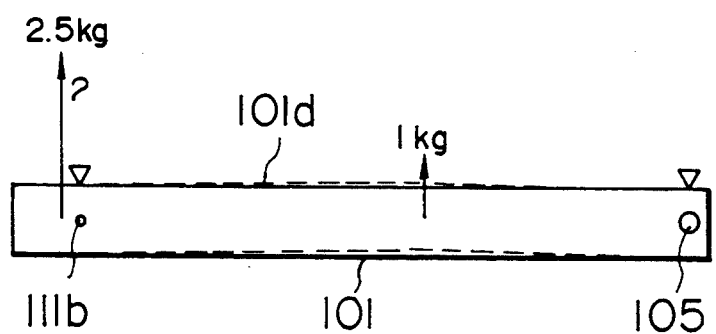
FIG. 10 is an illustration of deformation of an upper structure of a facsimile apparatus in which a thermal print head is mounted on an end portion of the upper structure.

FIGS. 9 and 10 illustrate load and state of deformation applied to the upper structure of the facsimile apparatuses. More specifically, FIG. 9 illustrates the state of deformation of the upper structure of the known facsimile apparatus shown in FIG. 5. In the known facsimile apparatus, since the thermal print head is mounted on the central portion of the upper structure, the pressing load of 2.5 kg is applied to the central portion of the upper structure 1 when the latter is fixed at its both ends by the pivot 5 and the lock arm pin 11b, so that the upper structure is upwardly deflected as indicated by the arrow 1d. On the other hand, FIG. 10 shows the state of deformation of the first embodiment of the facsimile apparatus shown in FIG. 3. In this facsimile apparatus, although the upper structure carries at its central portion the linear image sensor, the amount of upward deflection of the upper structure indicated by 1d is much smaller than that in the known apparatus shown in FIG. 5, because the pressing load to be exerted on the linear image sensor is as small as 1 kg. It is therefore not necessary to enhance the rigidity of the upper structure.

Figure 6:
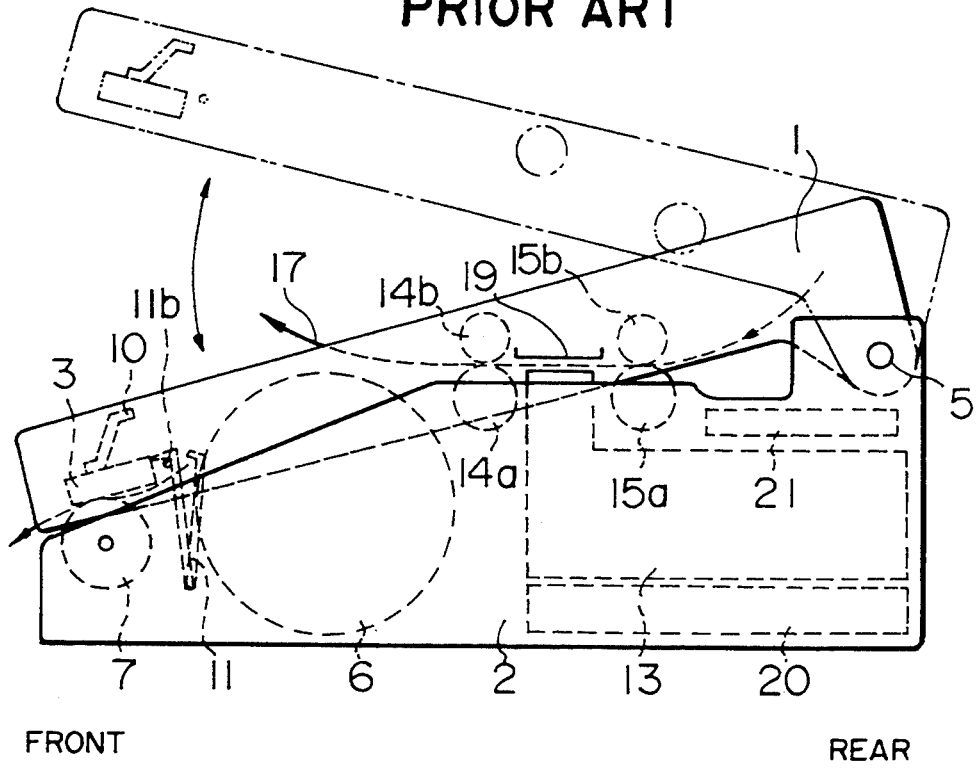
FIG. 6 is a sectional view of still another prior art facsimile apparatus.
Figure 11:
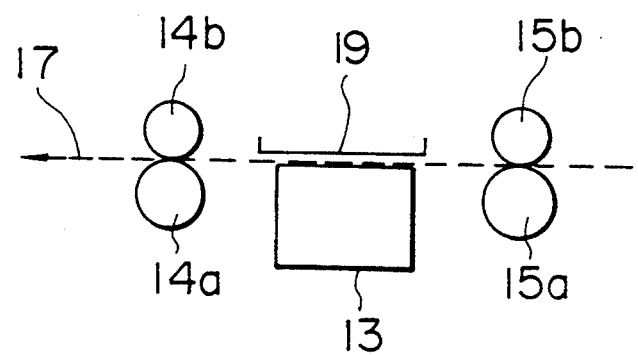
FIG. 11 is a schematic illustration of an image reading system employing a CCD sensor.
Figure 12:
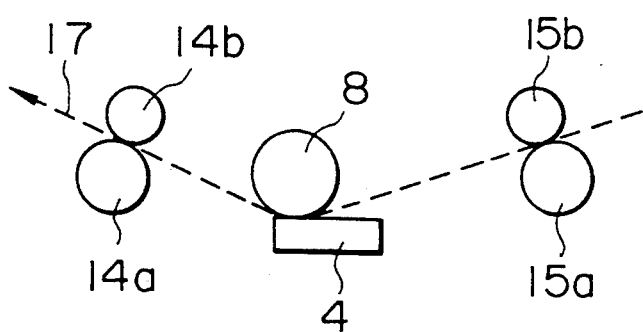
FIG. 12 is a schematic illustration of a reading system of a known facsimile apparatus employing a contact-type linear image sensor.

FIG. 11 illustrates the reading system of the known facsimile apparatus shown in FIG. 6, As stated before, this known facsimile apparatus employs, as the liner image sensor 13, a CCD sensor having a fine optical system including lenses and mirrors. In order to convey the original sheet 17, the facsimile apparatus employs a pair of original feed rollers 15a,15b and a pair of original eject rollers 14a, 14b. Image on the original sheet 17 is read while the latter passes through the gap between the linear image sensor 13 and the white plate 19. FIG. 12 shows the reading system of the known facsimile apparatus shown in FIG. 5. This facsimile apparatus employs, as the linear image sensor 4, a contact type linear image sensor having an array of photoelectric conversion elements of a length equal to the width of the original sheet to be read. When a contact type sensor is used, the original sheet encounters a large resistance so that the original sheet cannot be advanced by the force of the original conveyor sheet 8 alone because this roller has a small coefficient of friction. Consequently, a pair of original feed rollers 15a, 15b and a pair of original eject rollers 14a, 14b as in the facsimile apparatus shown in FIGS. 6 and 11, in addition to the original conveyor roller 8.

In contrast to these known facsimile apparatus, the facsimile apparatus of the present invention does not have any original feed roller and original eject roller, thus contributing to reduction in the size and price of the facsimile apparatus. Removal of jamming original sheet is difficult to conduct in the known facsimile apparatus shown in FIGS. 11 and 12. To facilitate removal, rollers of each pair has to be arranged separably such that one 14a of the original feed rollers and one 14a of the original eject rollers are mounted on the lower structure, while the other rollers 15b, 14b of both pairs are mounted on the upper structure so as to be movable away from the associated rollers 15a, 14a as the upper structure is swung to the open position. This arrangement is complicated and requires high precision in the assembly in order that the rollers of each pair can correctly engage with each other. In contrast, in the facsimile apparatus of the present invention, assembly can be done without difficulty because all the rollers are on the lower structure. Needless to say, the use of contact type linear image sensor, rather than a CCD sensor with fine optical system, is preferred, from the view point of reduction in the apparatus size.

Figure 14:
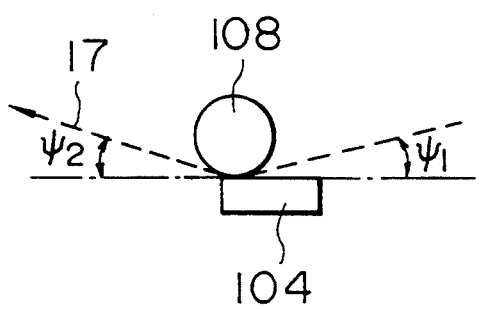
FIG. 14 is a schematic illustration of the reading system of a facsimile apparatus of the present invention employing a contact type linear image sensor.
Figure 15:
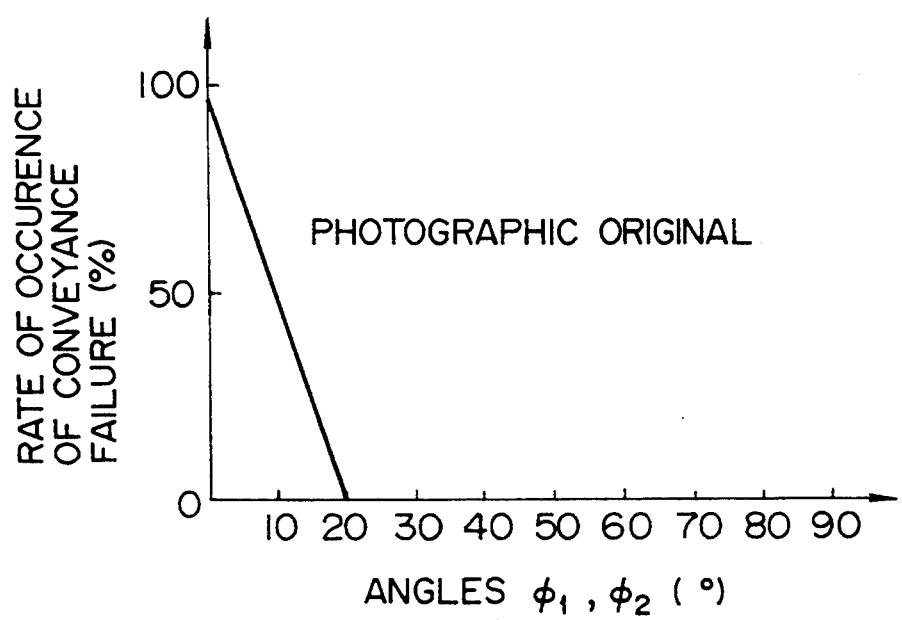
FIG. 15 is a graph showing the relationship between the angle formed between a photographic original and the sensor surface and the rate of original conveyance failure.
Figure 16:
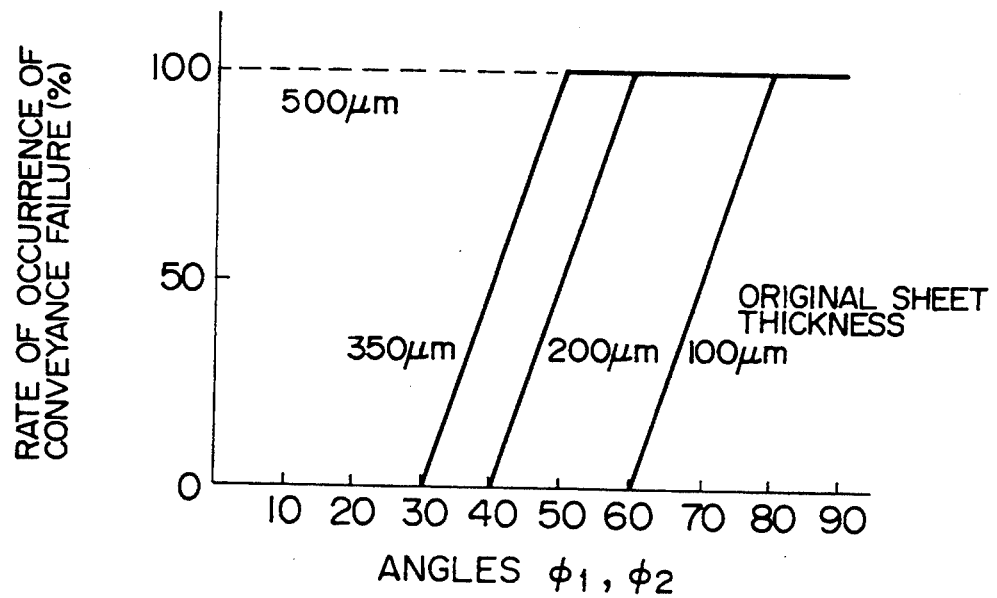
FIG. 16 is a graph showing the relationship between the angle formed between an original and the sensor surface and the rate of original conveyance failure, as determined for a variety of original thicknesses.

FIG. 14 shows the reading system of the facsimile apparatus of the present invention. This facsimile apparatus employs a contact type linear image sensor. The original sheet 17 is only conveyed by a single original conveyor roller 108. In order that the original sheet is stably conveyed, the original feed angle $\phi 1$ and the original eject angle $\phi 2$ are set to range between 20° and 30°, respectively FIGS. 15 and 16 illustrate how the conveyance of the original sheet is affected by the angles $\phi 2$ and $\phi 1$ of feed and eject of the original sheet. More specifically, FIG. 15 illustrates the rate of occurrence of conveyance failure in relation to the angles $\phi 1$ and $\phi 2$, as observed when an original having a slippery surface such as a photograph is conveyed. Conveyance failure tends to occur due to sticking of the original to the surface of the sensor when the angles $\phi 1$ and $\phi 2$ are below 20°. This problem, however, can be overcome by setting the angles $\phi 1$ and $\phi 2$ to 20° or greater. FIG. 16 shows rate of occurrence of original conveyance failure versus thickness of the original sheet. It will be seen that thick original sheet having high rigidity cannot be conveyed when the angles $\phi 1$ and $\phi 2$ exceed 30°. The maximum thickness of original sheet which can be conveyed by the single roller is 350 $\mu$m. The original sheet of this maximum thickness can be conveyed without failure when the angles $\phi 1$ and $\phi 2$ are set to be 30° or smaller. Thus, original sheets having slippery surfaces such as photographs and thick original sheets up to 350 $\mu$m in thickness can be conveyed without trouble when the angles $\phi 1$ and $\phi 2$ are set between 20° and 30°.

Figure 17:
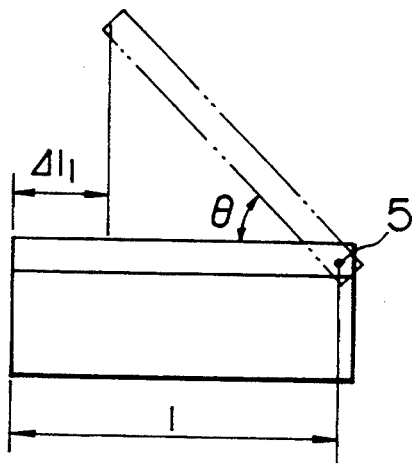
FIG. 17 is a schematic illustration of a known facsimile apparatus with the upper structure swung to an open position.
Figure 18:
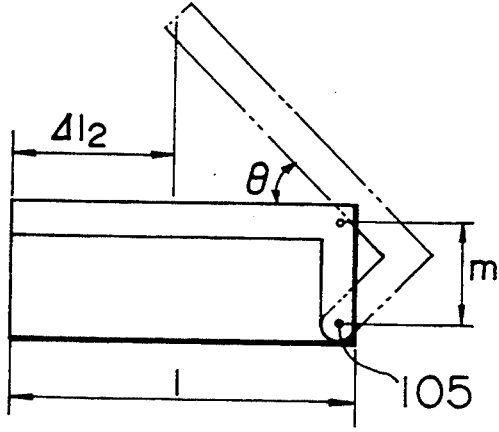
FIG. 18 is a schematic illustration of a facsimile apparatus of the present invention with the upper structure swung to the open position.

FIG. 17 schematically illustrates a known facsimile apparatus having upper and lower structure, with the upper stricture swung to the open position. In this known facsimile apparatus, the pivot 5 about which the upper structure swings is located on an upper part of the rear end of the lower structure. Representing the angle between the lower structure and the upper structure in open state by $\theta$ and the length of the facsimile apparatus by $\theta$, the length $\Delta l_1$ of opening is a small as $1 − 1 \cos \theta$. FIG. 18 schematically shows a facsimile apparatus of the present invention, with the upper structure swung to the open position so as to form an angle $\theta$ to the lower structure. In this facsimile apparatus, the pivot 105 is located on a lower part of the rear end of the lower structure. Representing the distance between the pivot point 105 and the upper structure by m, the length of opening $\Delta l_2$ is represented by $1 + m \sin \theta − 1 \cos \theta$. Consequently, the length of opening is $m \sin \theta$ greater than that in the known facsimile apparatus. According to the invention, it is possible to obtain a greater opening size, thus facilitating operations such as setting of new roll or recording medium, and removal of jamming original sheet and recording medium, over the known facsimile apparatus.

The use of a single original conveyor roller for conveying original sheets of various thicknesses and surface states is advantageous because the number of rollers is reduced to lower the price of the apparatus. In addition, the assembly of the facsimile apparatus is facilitated because all the rollers are fixed to the lower structure and no roller is fixed to the upper structure. The conveyance of original sheets of various thicknesses with a single conveyor roller can be realized as follows. Comparatively thin original sheets can be conveyed without any restriction because they have low levels of rigidity. However, original sheets of 350 $\mu$m or thicker are stiff and can stably be conveyed when the angle at which the original sheet is fed and the angle at which the same is ejected are set to be not greater than 30° to the surface of the linear image sensor. When an original sheet having a highly smooth surface, e.g., a photograph, is conveyed, the conveyance tends to fail due to sticking of the original sheet to the surface of the linear image sensor. This problem, however, can be avoided when the above-mentioned angle is set to 20° or greater. Thus, in order that a variety of types of original sheets are conveyed, the angle at which the original sheet is fed and the angle at which the same is ejected is set to fall within the range between 20° and 30° to the surface of the sensor.

Figure 13:
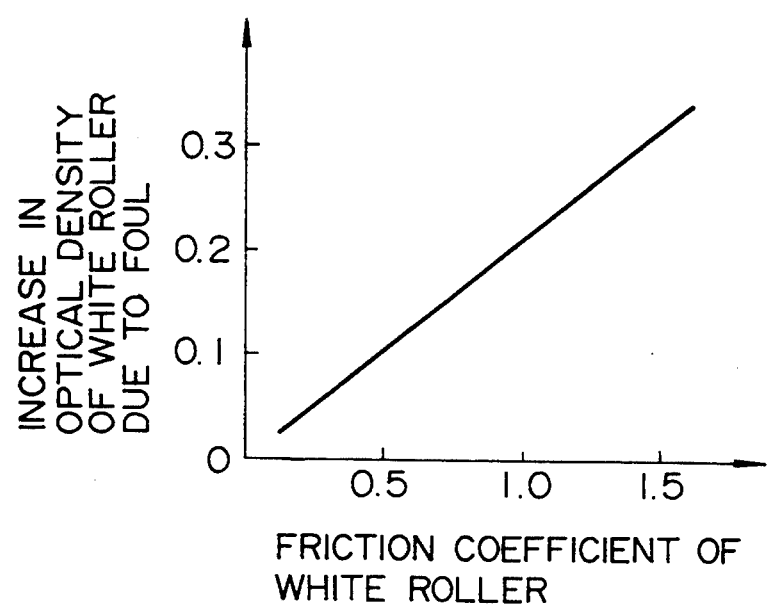
FIG. 13 is a graph showing the relationship between friction coefficient of a white roller and fouling tendency.

As explained before, the use of a contact type linear image sensor, which has a photoelectric element array of a length equal to the maximum width of the original sheet handled by the facsimile apparatus, is advantageous because it can reduce the overall size of the facsimile apparatus. This type of linear image sensor, however, has a drawback in that the output level is undesirably changed according to temperature or lowered during long use. In order to compensate for such a change in the output level, it is necessary to photoelectrically convert the level of brightness of the original conveyor roller in advance of the photoelectric conversion of the image information carried by the original sheet. To attain a higher degree of compensation, it is necessary that the optical density of the surface of the original conveyor roller is maintained at a constant white level. This essentially requires that the rubbery surface of this roller is made of a material which is less liable to foul. In general, however, such rubbery material having small tendency of foul has a small level of coefficient of friction as shown in FIG. 13 and, hence, exhibits a small force for advancing the original sheet. It has been therefore necessary to provide original sheet feed rollers and original sheet eject rollers as in the known facsimile apparatus shown in FIG. 5. According to the invention, the compensation of the output is achieved on the basis of the output of a specific one of the photoelectric conversion elements of the sensor array, thus eliminating the necessity for the use of a rubber roller having a small coefficient of friction. According to the invention, therefore, the original sheet can stably be advanced even by a single original conveyor roller. Furthermore, the upper structure is swingable to an open position about a pivot which is provided on the rear part of the apparatus, so that the work such as setting of a new roll of recording medium can be done easily. Furthermore, since the pivot is located at a level which is below ½ the height of the lower structure. Consequently, the upper structure can be swung to provide a large size of opening, further facilitating setting of the new roll of recording medium and other kinds of work.

Furthermore, the thermal print head which requires a large pressing load is provided on the front portion of the apparatus, while the original conveyor roller which requires comparatively small pressing load is disposed in the central portion of the apparatus. Consequently, the deflection of the upper structure is decreased to reduce the requirement for enhancing the rigidity of the upper structure. The conveyance of the original sheet is conducted by a single rubber roller. At the same time, conveyance of the recording medium is effected by a single rubber roller. Thus, the facsimile apparatus of the present invention employs only two rollers, which contributes to reduction in the size and the price of the whole apparatus. Furthermore, these two rollers are mounted on the lower structure, so that the upper structure is not required to carry any roller, so that the assembly of the apparatus is facilitated. Furthermore, since the angle at which the original sheet is fed and the angle at which the same is ejected are set to range from 20° to 30°, it is possible to convey, by a single roller, both a slippery original sheets such as photographs and rigid original sheets having large thickness up to 350 $\mu$m.

Figure 2:
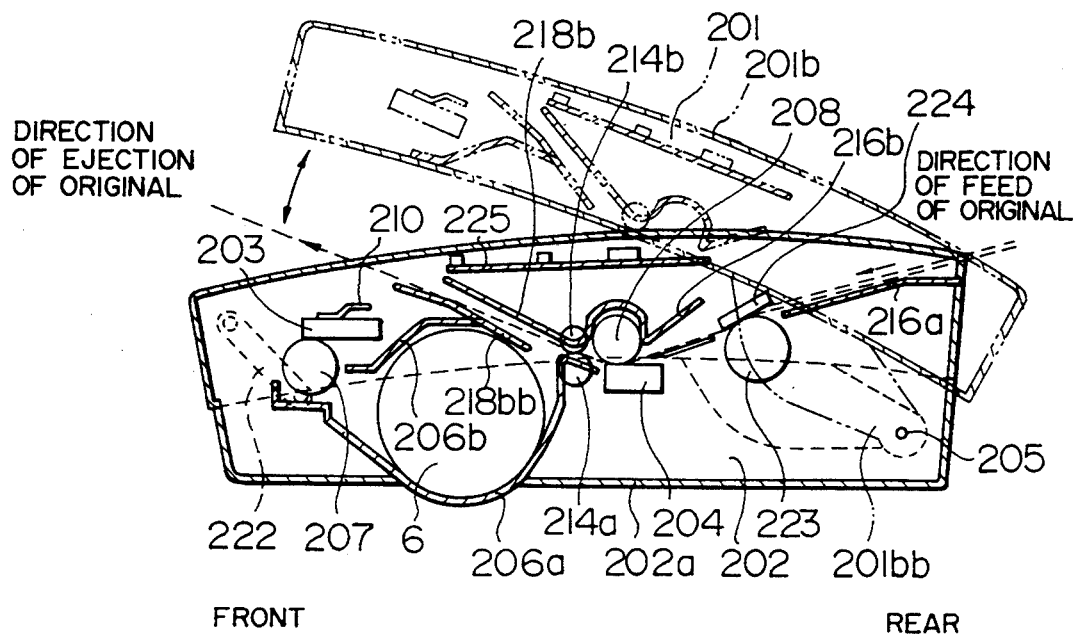
FIG. 2 is a sectional view of a second embodiment of the facsimile apparatus in accordance with the present invention.

As is the case of the embodiment of FIG. 1, the embodiment of FIG. 2 has a lower structure 202 and an upper structure 201 swingable between a raised open position and a lowered close position about a pivot 205. The embodiment of FIG. 2 employs a thermally sensitive recording system which is disposed, as in the case of the recording system in the embodiment of FIG. 1, in the front portion of the apparatus. It is to be noted, however, that the embodiment of FIG. 2 is further provided with a cutter 222 which is disposed at the front side of the thermal print head 203. The cutter 222 is loaded so as to cut the recording medium carrying the received image at a suitable length. A reading system, employing a contact type linear image sensor 204, is disposed substantially at the center of the apparatus. Furthermore, the facsimile apparatus of embodiment of FIG. 2 is provided with an automatic sheet feeding mechanism which feeds plural original sheets one by one after separating them from a stack of original sheets. More specifically, a stack of original sheets carrying image information to be transmitted is placed on the top surface 216a of the lower structure. The automatic sheet feeding mechanism employs a separation roller 223 and a separation member 224 which are made of rubbery materials having different values of friction coefficient. The lowermost one of the stack of original sheets placed on the top surface 216a of the lower structure is fed by the separation roller 223 towards the linear image sensor. The original sheet thus fed is conveyed by an original conveyor roller 208 after photoelectric conversion of the image, and is finally elected by means of original eject rollers 214a, 214b. A silicone rubber having a friction coefficient of 1.0 is used as the material of the original conveyor roller. A sheet of recording paper 6 as the recording medium is made to pass through the gap between the thermal print head 203 and the reading sensor 204 and is placed between a recording paper table 206a on the lower structure and a recording paper pressing member 206b provided in the upper structure. The upper structure carries, in addition to the thermal print head 203 and the paper eject roller 214b, a circuit board 225 of an operation panel and the separation member 224 described above. The lower structure carries, in addition to the recording paper conveyor roller 207, linear image sensor 204 and the original conveyor roller 208, the separation roller 223, the original eject roller 214a, the cutter 222 and so forth. The angle at which the original is fed and the angle at which the same is ejected are determined to range between 2020 and 30° with respect to the surface of the linear image sensor 4. The pivot 205 is located at a lower portion of the rear end of the lower structure.

In the facsimile apparatus of the embodiment of FIG. 2, a wide opening is formed when the upper structure is swung to the raised open position, so that various kinds of work such as setting of a new roll of recording paper and removal of jamming recording paper or original sheet can be done very easily. Furthermore, amount of deflection of the upper structure is reduced by virtue of the fact that the thermal print head 203 which requires a comparatively large pressing load and the original conveyor roller 208 which does not require so large pressing load are respectively provided on the front and central portions of the upper structure. It is therefore not necessary to specifically enhance the rigidity of the upper structure. For the purpose of conveying the original sheet, the embodiment of FIG. 2 employs original eject rollers 214a, 214b in addition to the original conveyor roller 208. These two additional rollers 214a, 214b, however, may be omitted without causing any problem in the function of the facsimile apparatus. It is, however, necessary that the separation roller 223, which has a function to feed the original sheets one by one, is fixed to the lower structure. Thus, the facsimile apparatus of embodiment of FIG. 2 may employ three rollers: namely, the recording paper conveyor roller 207, original sheet conveyor roller 208 and the separation roller 223. Furthermore, all these three rollers are fixed to the lower structure, so that the same advantages as those produced by the embodiment of FIG. 1, i.e., reduction in the size and price and ease of assembly, are offered also by the embodiment of FIG. 2. The embodiment of FIG. 2 may employ original eject rollers 14a, 14b as those used in the known apparatus shown in FIG. 6. However, since the original conveyor roller 208 has a large friction coefficient, the original fed rollers 15a, 15b may be dispensed with. Thus, the number of rollers can be reduced even when the paper eject rollers 14a, 14b are employed. Needless to say, a contact type linear image sensor is preferably employed for the purpose of reducing the size of the apparatus. The path of convey of the original sheet in this embodiment is constructed substantially in the same way as that in the first embodiment, thus ensuring stable convey of the original sheet.

Figure 19:
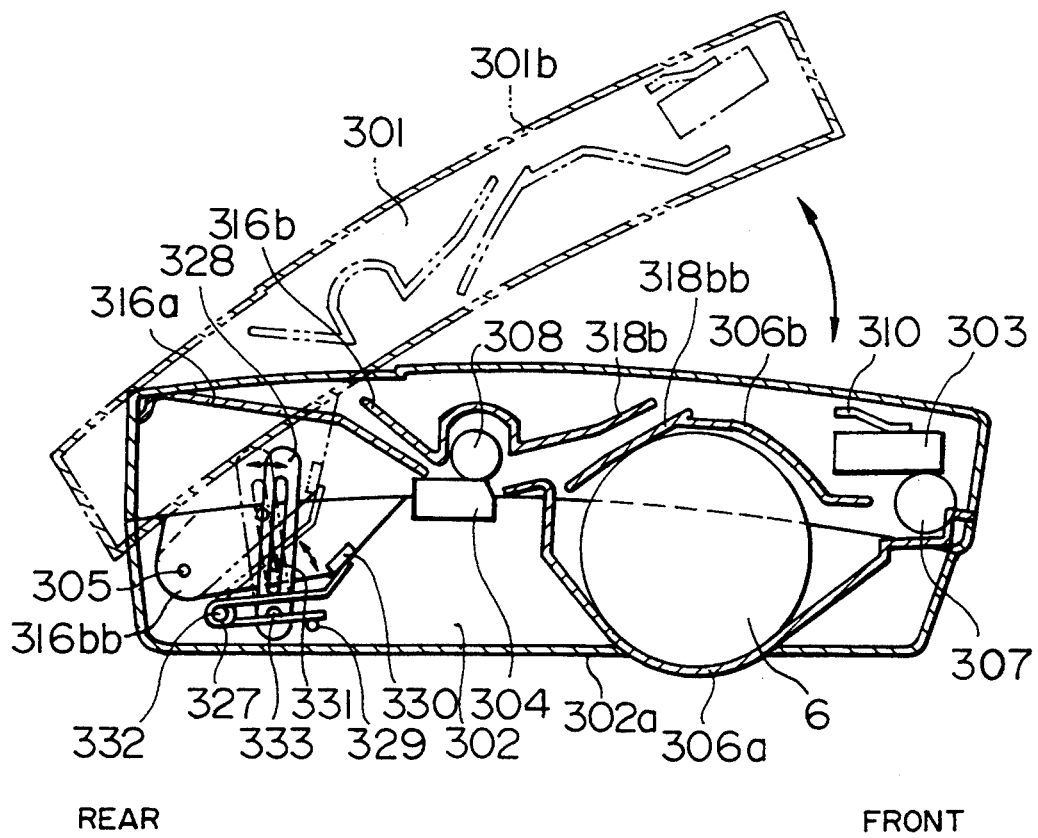
FIG. 19 is a sectional view of a third embodiment of the facsimile apparatus in accordance with the present invention.

The facsimile apparatus of the embodiment of FIG. 19 has, as in the case of the the embodiment of FIG. 1, a lower structure 302 and an upper structure 301 which is swingable between a raised open position and a lowered close position about a pivot 305. A recording system disposed in the front portion of the apparatus includes a thermal print head 303 fixed to the upper structure and a recording paper conveyor roller 307 fixed to the lower structure and adapted to convey a recording paper 6. The thermal print head 303 is pressed onto the recording paper conveyor roller 307 by a head pressing spring 310. A reading system includes a contact type linear image sensor 304 and an original conveyor roller 308 which are carried by the lower structure. The image carried by the original sheet is photoelectrically converted by the linear image sensor 304 as the original sheet is conveyed through the gap between the top surface 316a of the lower structure and the lower surface 316b of the upper structure. The original sheet is then ejected through an area defined between an original eject guide 318b secured to the upper structure and an original eject guide 318bb provided on the lower structure. The recording paper 6 is disposed between a recording paper table 306a in the lower structure and a recording paper pressing member 306b in the upper structure.

The lower structure has a spring support pivot 332 and a member support pivot 333. The spring support pivot 332 supports a spring 327, while the member support pivot 333 supports a slide member 328 having an elongated slot formed therein. One end of the spring 327 is retained by a spring retainer pin 329 provided on the lower structure. The upper structure is provided with an arm 301bb which has a spring pressing member 330 and a slide pin 331. The spring 327 is loaded between the above-mentioned spring retainer 329 and the spring pressing member 330, such that the restoring force of the spring 327 acts to urge the upper structure upward. The slot in the slide member 328 slidably receives the slide pin 331 on the arm 301bb of the upper structure. The width of the slot is slightly smaller than the diameter of the slide pin, so that the slide pin slides along the slot against a certain level of resistance produced by friction.

Figure 20:
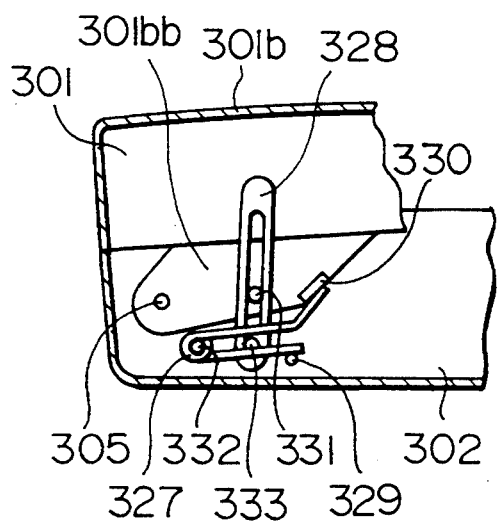
FIG. 20 is a detailed illustration of the facsimile apparatus shown in FIG. 19 with the upper structure set in a close position, showing particularly the portion of the apparatus around a pivot.
Figure 21:
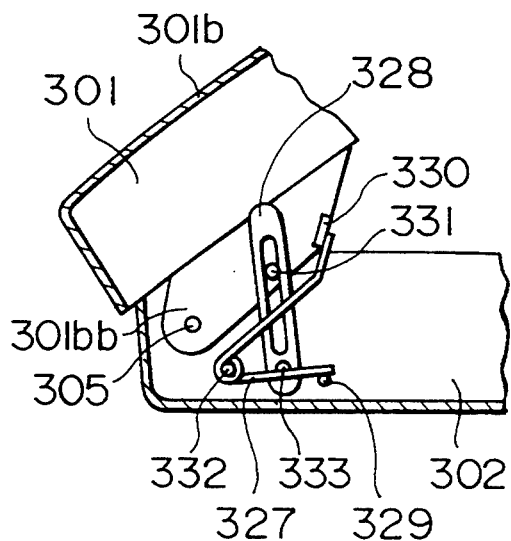
FIG. 21 is a detailed illustration of the facsimile apparatus shown in FIG. 19 with the upper structure set in the open position, showing particularly the portion of the apparatus around a pivot.

A description will now be given of the mechanism for swinging the upper structure between the open and close positions in the third embodiment of the facsimile apparatus. FIG. 20 shows the facsimile apparatus in a state in which the upper structure has been lowered to the close position. In this state, the spring 327 has been pressed downward, tending to swing the upper structure upward. A lock arm (not shown) provided on the front portion of the apparatus as viewed in FIG. 3 retains the upper structure in the close position against the force of the spring 327. In this state, the slide pin 331 is located at a lower position within the slot formed in the slide member 328. FIG. 21 shows the apparatus in the state in which the upper structure has been swung to the open position. The upper structure is held at a certain degree of opening due to the balance between the opening force exerted by the spring 327 and the frictional force acting between the slide pin 331 and the surfaces or edges of the slot in the slide member 328.

With this arrangement, the upper structure which carries the thermal print head and hence has a certain weight is held at a desired degree of opening where the balance is obtained between the restoring force of the spring and the force of friction between the slide member and the pin. This eliminates the necessity for manual holding of the upper structure at the open position during, for example, setting of a new roll of recording paper or removal of jamming paper. This arrangement also ensures that the downward swinging of the upper structure is done gently, thus eliminating any risk of injury of the user's hand due to pinching between the upper and lower structures which may occur if the upper structure is quickly swung downward. If the arrangement is such that the upper structure can be lifted by the force of the spring without any counter force, the upper structure will be moved to the maximum open position. Namely, it is not possible to hold the upper structure at an intermediate open position. Conversely, the slide member alone cannot hold the heavy upper structure at the desired open position. Thus, keeping the upper structure at a desired open position without manual aid is possible only through the simultaneous use of the spring and the slide member.

Figure 23:
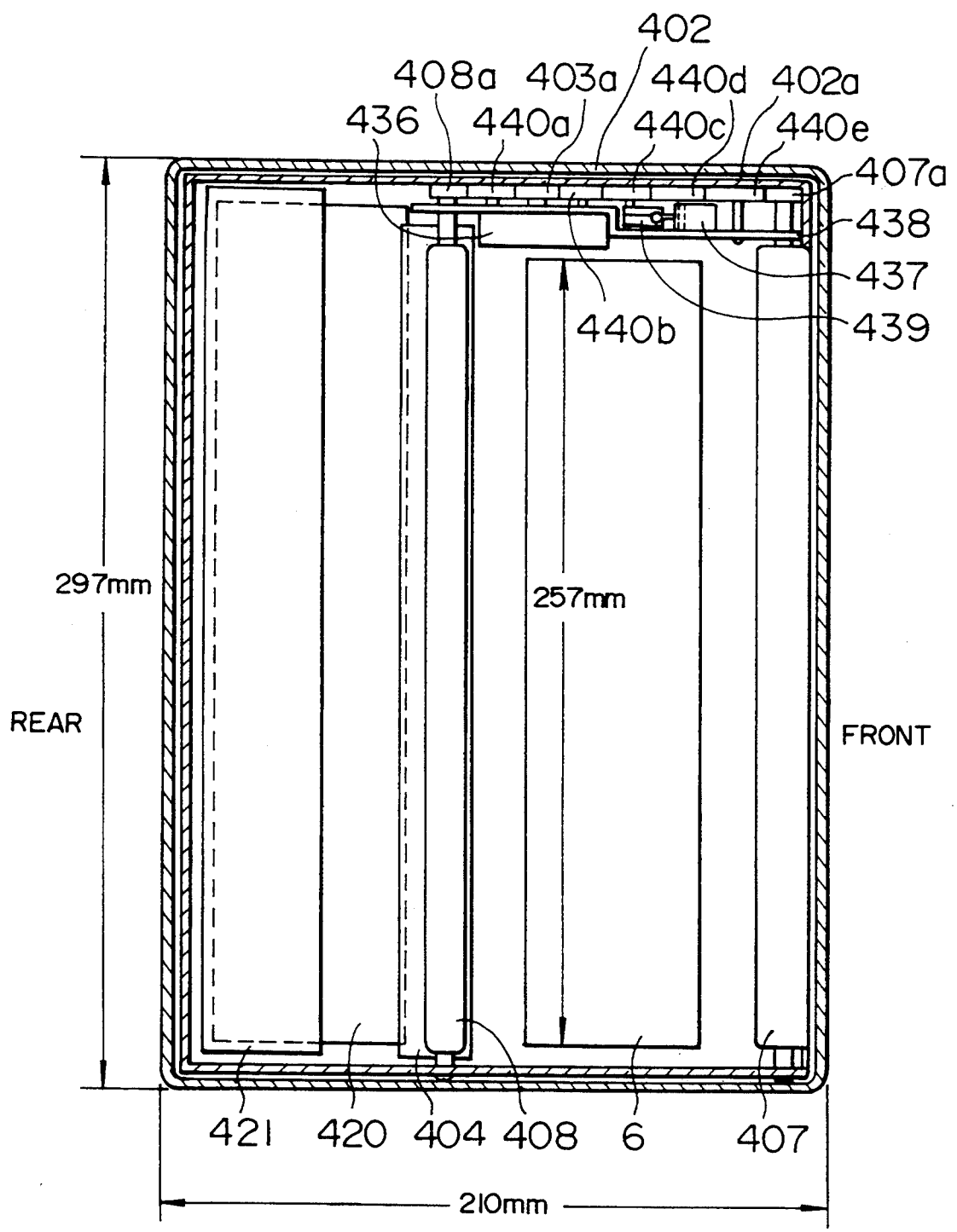
FIG. 23 is a sectional view illustrating a conveying system employed in a facsimile apparatus of the present invention.

In the embodiment of FIG. 23, as in the embodiment of FIG. 1, a roller 407 for conveying the thermally sensitive recording paper is mounted on the front portion of the apparatus, while an original conveyor roller 408 and a contact-type linear image sensor 404 are fixed to the central portion of the apparatus. A thermally sensitive paper 6 is placed between a thermally sensitive paper conveyor roller 407 and the original conveyor roller 408. The maximum width of the paper which can be set in this position is 257 mm. A power supply 421 and a control circuit board 420 are fixed to the rear part of the apparatus.

The thermally sensitive paper conveyor roller 407 and the original conveyor roller 408 are power driven by the motor 436. When the facsimile apparatus operates in the transmission mode, the driving torque of the motor 436 is transmitted via a transmission gear 440a from a motor gear 403 to a gear 408a fixed to the original conveyor roller 408, thereby driving the roller 408. When the facsimile apparatus operates in the receiving mode, the driving torque of the motor 436 is transmitted via transmission gears 440b, 440c, 440d, 440e from a motor gear 403 to a gear 407a fixed to the thermally sensitive paper conveyor roller 407, thereby driving the roller 407. When the apparatus operates in copying mode, the output torque of the motor is transmitted both to the gears 407a and 408a via respective transmission gears, thereby simultaneously driving both the thermally sensitive paper conveyor roller 407 and the original sheet conveyor roller 408. The path of transmission of the driving torque is changed-over according to which one of the copying, transmission and receiving modes is selected, by the action of a solenoid 437 and a gear train switching arm 439 which in cooperation switch the transmission gears. The motor, gears, solenoid and the switching arm are carried by a single gear chassis 438.

Thus, in the embodiment of FIG. 23, both the original conveyor roller 408 and the thermally sensitive paper conveyor roller 407 are driven by a single motor 436. In addition, the motor as the driving power source, gears for transmitting driving torque and the solenoid and the arm for switching the path of torque transmission are disposed concentrically on one side of the facsimile apparatus, thus minimizing dead space. Consequently, the overall width of the facsimile apparatus can be reduced to 297 mm or less. The overall length of the apparatus also can be reduced to 210 mm or less, by virtue of the use of the contact type linear image sensor and the single roller for conveying the original sheet.

The linear image sensor employed in this facsimile apparatus has an effective sensing length of 257 mm, so that image information can be transmitted from large size of original sheet up to B-4 size. Although one transmission gear and four transmission gears are employed respectively for the transmitting system and the receiving or recording system, such gear arrangement is only illustrative and may be modified as required.

As will be understood from the foregoing description, the present invention offers the following advantages.

The upper structure is swingable about a pivot which is provided on the rear part of the apparatus, so that a large opening is formed when the upper structure is swung to open position, thus facilitating various kinds of work such as setting of a new roll of recording medium and removal of recording medium or original sheet jamming in the apparatus.

The deflection of the upper structure is reduced because the thermal print head which requires a comparatively large pressing load is mounted on the front part, while the original sheet conveyor roller which requires a comparatively small pressing load is mounted on the central portion of the apparatus. It is therefore not necessary to increase the rigidity of the upper structure.

The original sheet can be stably conveyed even by a single original sheet conveyor roller, so that the facsimile apparatus may employ only two rollers, which contributes to reduction both in the size and price. Furthermore, assembly can be done easily because all the rollers can be mounted on the lower structure.

Both the original sheet conveyor roller and the recording medium conveyor roller can be driven by a common driving motor. Thus, the facsimile apparatus can operate with a reduced number of driving motors, which also contributes to the reduction in the price.

The upper structure, when swung upward to enable setting of the new roll of recording paper or removal of jamming paper, can be held at any desired degree of opening without requiring any manual support. In addition, quick movement of the upper structure to the closing position is prevented, thus avoiding any risk of injury of the user's hand which otherwise may occur due to pinching between the upper and lower structures.

Finally, according to the invention, the facsimile apparatus can transmit image information on a B-4 size original sheet and record received information in B-4 size, but yet the width and length of the facsimile apparatus is smaller than the width and length of A-4 size paper sheet. This facsimile apparatus, therefore, occupies only a small area less than that of an A-4size paper sheet, thus allowing efficient use of the limited area on a desk.

What is claimed is:

1. A facsimile apparatus having a function to convert image information into electric signals and to transmit the electric signals to a communication network and a function to receive electric signals from said communication network and to convert the received electric signals into image information, and including a lower structure and an upper structure which is swingable about a pivot provided on a rear portion of the apparatus between a raised open position and a lowered closed position, said facsimile apparatus comprising: a recording thermal print head for recording image information on a recording medium; a recording medium conveyor roller for conveying said recording medium, said thermal print head and said recording medium conveyor roller being disposed on a front portion of said apparatus; a linear image sensor for reading said image information carried by an original sheet; and an original sheet conveyor roller for conveying said original sheet, said linear image sensor and said original sheet conveyor roller being disposed on a central portion of said apparatus, a supply of said recording medium being disposed between said thermal print head and said linear image sensor; said thermal print head being fixed to said upper structure, said recording medium conveyor roller, said linear image sensor and said original conveyor roller being fixed to said lower structure; wherein said recording medium conveyor roller conveys said recording medium from said supply of recording medium past said thermal print head and discharges said recording medium, after it has been subjected to printing, forwardly of said facsimile apparatus, and said original sheet conveyor roller conveys said original sheet past said linear image sensor and discharges said original sheet, after it has been subjected to photoelectric conversion, forwardly of said facsimile apparatus.

2. A facsimile apparatus according to claim 1, wherein said linear image sensor is a contact type linear image sensor having a photoelectric conversion element array of a length equal to the maximum width of the original sheet which can be handled by said facsimile apparatus.

3. A facsimile apparatus according to claim 1, wherein only two conveyor rollers are disposed in said facsimile apparatus, said two conveyor rollers consisting of said recording medium conveyor roller and said original sheet conveyor roller.

4. A facsimile apparatus having a function to convert image information into electric signals and to transmit the electric signals to a communication network and a function to receive electric signals from said communication network and to convert the received electric signals into image information, and including a lower structure and an upper structure which is swingable about a pivot provided on a rear portion of the apparatus between a raised open position and a lowered closed position, and having only two conveyor rollers disposed in said facsimile apparatus, said facsimile apparatus comprising: a recording thermal print head for recording said image information on a recording medium; a recording medium conveyor roller as one of said only two conveyor rollers, for conveying said recording medium, said thermal print heat and said recording medium conveyor roller being disposed on a front portion of said apparatus; a linear image sensor for reading said image information on an original sheet; an original sheet conveyor roller as the other of said only two conveyor rollers, said linear image sensor and said original sheet conveyor roller being disposed on a central portion of said apparatus, a supply of said recording medium being disposed between said thermal print head and said linear image sensor; said thermal print head being fixed to said upper structure, said recording medium conveyor roller, said linear image sensor and said original sheet conveyor roller being fixed to said lower structure.

5. A facsimile apparatus according to any one of claims 1 to 3, further comprising: a driving motor for driving said recording medium conveyor roller and said original sheet conveyor roller; and a driving power transmission device for transmitting the driving power from said driving motor to said recording medium conveyor roller and said original sheet conveyor roller.

6. A facsimile apparatus according to any one of claims 1 to 3, wherein said facsimile apparatus has a width and length not greater than those of A-4 size paper, and can transmit image information on an original of a size greater than A-4 size and can receive image information of a size greater than A-4 size.

7. A facsimile apparatus according to claim 4, wherein said recording medium conveyor roller conveys said recording medium from said supply of recording medium past said recording thermal print head and discharges said recording medium, after it has been subjected to printing, forwardly of said facsimile apparatus, and said original sheet conveyor roller conveys said original sheet past said linear image sensor and discharges said original sheet, after it has been subjected to photoelectric conversion, forwardly of said facsimile apparatus.

* * * * *